United States Patent
Guo et al.

(10) Patent No.: US 10,579,595 B2
(45) Date of Patent: Mar. 3, 2020

(54) METHOD AND DEVICE FOR CALLING A DISTRIBUTED FILE SYSTEM

(71) Applicant: BEIJING BAIDU NETCOM SCIENCE AND TECHNOLOGY CO., LTD., Beijing (CN)

(72) Inventors: Bo Guo, Beijing (CN); Wen Zhao, Beijing (CN); Yunqi Hong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 355 days.

(21) Appl. No.: 15/722,840

(22) Filed: Oct. 2, 2017

(65) Prior Publication Data

US 2018/0189315 A1 Jul. 5, 2018

(30) Foreign Application Priority Data

Jan. 3, 2017 (CN) .......................... 2017 1 0002024

(51) Int. Cl.
G06F 17/30 (2006.01)
G06F 16/176 (2019.01)
G06F 16/14 (2019.01)
G06F 16/16 (2019.01)
G06F 16/182 (2019.01)

(52) U.S. Cl.
CPC ........ *G06F 16/1774* (2019.01); *G06F 16/148* (2019.01); *G06F 16/162* (2019.01); *G06F 16/182* (2019.01)

(58) Field of Classification Search
CPC .. G06F 16/1774; G06F 16/162; G06F 16/182; G06F 16/148
See application file for complete search history.

(56) References Cited

U.S. PATENT DOCUMENTS

| | | | |
|---|---|---|---|
| 6,519,626 B1* | 2/2003 | Soderberg | G06F 16/10 709/203 |
| 2005/0010610 A1* | 1/2005 | Nishimura | H04N 1/32363 |
| 2014/0201177 A1* | 7/2014 | Suryanarayan | G06F 16/182 707/705 |
| 2014/0330875 A1* | 11/2014 | Gulamali | G06F 16/182 707/827 |
| 2017/0147602 A1* | 5/2017 | Darcy | H04L 63/10 |
| 2017/0300508 A1* | 10/2017 | Jernigan, IV | G06F 16/16 |

FOREIGN PATENT DOCUMENTS

CN 104702655 A 6/2015

* cited by examiner

*Primary Examiner* — Jared M Bibbee
(74) *Attorney, Agent, or Firm* — Seed IP Law Group LLP (57) ABSTRACT

The present application discloses a method and device for scheduling a distributed file system. A specific implementation of the method comprises: creating a new session based on a received session request from a user terminal; sending a first locking request to a manager of the distributed file system, the first locking request used for requesting locking a lease directory; sending a request for creating a new subdirectory in the lease directory to the manager in response to receiving a response of successful locking to the first locking request, the new subdirectory being named using an IP address and a port of the new session; and designating the new session as a primary session in response to receiving a response of successful new creation to the request for creating the new subdirectory.

20 Claims, 4 Drawing Sheets

METHOD AND DEVICE FOR CALLING A DISTRIBUTED FILE SYSTEM

CROSS-REFERENCE TO RELATED APPLICATION

This application is related to and claims the priority from Chinese Application No. 201710002024.4, filed on Jan. 3, 2017, entitled "Method and Device for Calling Distributed File System," having Baidu Online Network Technology (Beijing) Co., Ltd. as the applicant, the entire disclosure of which is incorporated herein by reference.

TECHNICAL FIELD

The present application relates to the technical field of computers, specifically to the technical field of Internet, and more specifically to a method and device for calling a distributed file system.

BACKGROUND

A distributed file system based on distributed file system operation needs to solve all requirements related to high availability, for example, meeting requirements including leader selection, leader notification, Fence mechanism, replication and persistence of data streams, Compaction of the data streams, and the like.

A current distributed file system usually utilizes the following two high-availability design schemes:

1. A combination scheme: for example, a distributed service framework (ZooKeeper) scheme for leader selection, a heartbeat-based scheme or other independently-designed schemes. Fence adopts a third-party system or an independently-designed scheme; and data stream replication adopts an independently-designed replication scheme, and the like.

2. An unitary scheme: for example, a distributed consistency protocol (Raft), various libraries are realized based on the Raft protocol, and log streams of Raft are stored locally.

However, in the above two high-availability related schemes, the combination scheme often depends on a third party, even on multiple third parties at the same time, there are various independently-designed schemes in the system, and the overall architecture of the system is complex, high in stability risk and difficult to evolve. In the unitary scheme, a distributed file system implemented based on the Raft protocol is very slow to complementally build a copy, and it is difficult to implement a fast load balancing mechanism. In particular, it is difficult to implement system wide data stream splitting and merging, and cooperate with the distributed file system. For example, for a database suitable for unstructured data storage (HBase), if the data streams use the Raft protocol, a large amount of extra traffic overhead can be caused if it is still based on the distributed file system. If it is not based on the distributed file system, the stateless characteristics of HBase nodes will be lost.

SUMMARY

The objective of the present application is to provides an improved method and device for scheduling a distributed file system, to solve the technical problems mentioned in the above background section.

In a first aspect, the present application provides a method for scheduling a distributed file system, and the method comprises: creating a new session based on a received session request from a user terminal; sending a first locking request to a manager of the distributed file system, the first locking request used for requesting locking a lease directory; sending a request for creating a new subdirectory in the lease directory to the manager in response to receiving a response of successful locking to the first locking request, the new subdirectory being named using an IP address and a port of the new session; and designating the new session as a primary session in response to receiving a response of successful new creation to the request for creating the new subdirectory.

In some embodiments, the method further comprises one or more of: sending a request for updating a modification time of the lease directory to the manager periodically in a life span of the primary session; and sending a request for deleting the subdirectory in the lease directory and unlocking the lease directory in response to a close of the primary session.

In some embodiments, the sending a request for creating a new subdirectory in the lease directory to the manager in response to receiving a response of successful locking to the first locking request comprises: sending a first query request to the manager in response to receiving a response of successful locking to the first locking request, wherein the first query request is used for querying whether a subdirectory named using an IP address and a port of another session exists in the lease directory; sending a delete request to the manager in response to receiving the response of existence to the first query request, wherein the delete request is used for deleting the subdirectory in the lease directory; and sending the request for creating the new subdirectory in the lease directory to the manager in response to receiving a response of nonexistence to the first query request or receiving a response of successful deletion to the delete request.

In some embodiments, the method further comprises: examining whether a duration from the modification timestamp to a current time is longer than a preset duration at an interval of a predetermined duration in response to receiving a response of failed locking to the first locking request; sending a second locking request to the manager in response to the duration from the modification timestamp to the current time being longer than the preset duration, wherein the second locking request is used for requesting locking the lease directory; and sending the first query request to the manager in response to receiving a response of successful locking to the second locking request.

In some embodiments, the method further comprises: sending a second query request to the manager in response to receiving a response of failed locking to the second locking request, wherein the second query request is used for querying whether a subdirectory named using an IP address and a port of another session exists in the lease directory; and examining whether a duration from the modification timestamp to a current time is longer than a preset duration at an interval of a predetermined duration in response to receiving a response of existence to the second query request.

In some embodiments, the method further comprises: sending the first locking request for locking the lease directory to the manager of the distributed file system in response to receiving a response of nonexistence to the second query request.

In some embodiments, the method further comprises one or more of: examining whether a duration from the modification timestamp to a current time is longer than a preset duration at an interval of a predetermined duration in response to receiving a response of failed new creation to the request for creating a new subdirectory; examining whether a duration from the modification timestamp to a current time is longer than a preset duration at an interval of a predetermined duration in response to receiving a response of failed deletion to the delete request; and examining whether a duration from the modification timestamp to a current time is longer than a preset duration at an interval of a predetermined duration in response to the duration from the modification timestamp to the current time being not longer than the preset duration.

In some embodiments, the method further comprises: generating a log sequence number of each log for each data stream in response to receiving a request for generating logs; creating a new log file in response to switching the primary session or a size of the log file reaching a predetermined byte; naming the created log file after a smallest log sequence number in the log file; adding each of the log sequence number, lengths of the logs, check information and an IP address of a written session to header information of the created log file; and adding each of the log into the created log file until the size of the log file reaches the predetermined byte.

In some embodiments, the method further comprises: triggering a snapshot at an interval of a predetermined time in response to receiving a request for generating the snapshot; and deleting a log file having all log sequence numbers being smaller than log sequence numbers in the snapshot.

In some embodiments, the method further comprises: receiving a request for replaying logs; and replaying the logs according to the log sequence numbers.

In a second aspect, the present application provides a device for scheduling a distributed file system, and the device comprises: a session creating unit, which is used for creating a new session based on a received session request of a user terminal; a first locking request unit, which is used for sending a first locking request to a manager of the distributed file system, the first locking request used for requesting locking a lease directory; anew subdirectory creating request unit, which is used for sending a request for creating a new subdirectory in the lease directory to the manager in response to receiving a response of successful locking to the first locking request, the new subdirectory being named using an IP address and a port of the new session; and a primary session designating unit, which is used for designating the new session as a primary session in response to receiving a response of successful new creation to the request for creating the new subdirectory.

In some embodiments, the device further comprises one or more of: a modification timestamp unit, which is used for sending a request for updating a modification timestamp of the lease directory to the manager periodically in a life span of the primary session; and a deleting and locking unit, which is used for sending a request for deleting the subdirectory in the lease directory and unlocking the lease directory in response to a close of the primary session.

In some embodiments, the new subdirectory creating request unit comprises: a first query request subunit, which is used for sending a first query request to the manager in response to receiving a response of successful locking to the first locking request, wherein the first query request is used for querying whether a subdirectory named using an IP address and a port of another session exists in the lease directory; a subdirectory deleting subunit, which is used for sending a delete request to the manager in response to receiving the response of existence to the first query request, wherein the delete request is used for deleting the subdirectory in the lease directory; and a new subdirectory creating subunit, which is used for sending the request for creating the new subdirectory in the lease directory to the manager in response to receiving a response of nonexistence to the first query request or receiving a response of successful deletion to the delete request.

In some embodiments, the device further comprises: a duration examining unit, which is used for examining whether a duration from the modification timestamp to a current time is longer than a preset duration at an interval of a predetermined duration in response to receiving a response of failed locking to the first locking request; a second locking request unit, which is used for sending a second locking request to the manager in response to the duration from the modification timestamp to the current time being longer than the preset duration, wherein the second locking request is used for requesting locking the lease directory; and the subdirectory query subunit, which is used for sending the first query request to the manager in response to receiving a response of successful locking to the second locking request.

In some embodiments, the device further comprises: a second query request unit, which is used for sending a second query request to the manager in response to receiving a response of failed locking to the second locking request, wherein the second query request is used for querying whether a subdirectory named using an IP address and a port of another session exists in the lease directory; and the duration examining unit, which is further used for examining whether a duration from the modification timestamp to a current time is longer than a preset duration at an interval of a predetermined duration in response to receiving a response of existence to the second query request.

In some embodiments, the device further comprises: the first locking request unit, which is further used for sending the first locking request for locking the lease directory to the manager of the distributed file system in response to receiving a response of nonexistence to the second query request.

In some embodiments, the device further comprises one or more of: the duration examining unit, which is further used for examining whether a duration from the modification timestamp to a current time is longer than a preset duration at an interval of a predetermined duration in response to receiving a response of failed new creation to the request for creating a new subdirectory; the duration examining unit, which is further used for examining whether a duration from the modification timestamp to a current time is longer than a preset duration at an interval of a predetermined duration in response to receiving a response of failed deletion to the delete request; and the duration examining unit, which is further used for examining whether a duration from the modification timestamp to a current time is longer than a preset duration at an interval of a predetermined duration in response to the duration from the modification timestamp to the current time being not longer than the preset duration.

In some embodiments, the device further comprises: a log request receiving unit, which is used for receiving a request for generating logs; a sequence number generating unit, which is used for generating a log sequence number of each log for each data stream; a file creating unit, which is used for creating a new log file in response to switching the primary session or a size of the log file reaching a predetermined byte; a file naming unit, which is used for naming the created log file after a smallest log sequence number in the log file; an information adding unit, which is used for adding each of the log sequence number, lengths of the logs, check information and an IP address of a written session to header information of the created log file; and a log adding unit, which is used for adding each of the log into the created log file until the size of the log file reaches the predetermined byte.

In some embodiments, the device further comprises: a snapshot request receiving unit, which is used for receiving a request for generating a snapshot; a snapshot triggering unit, which is used for triggering the snapshot at an interval of a predetermined time; and a file deleting unit, which is used for deleting a log file having all log sequence numbers being smaller than log sequence numbers in the snapshot.

In some embodiments, the device further comprises: a replay request receiving unit, which is used for receiving a request for replaying logs; and a log replaying unit, which is used for replaying the logs according to the log sequence numbers.

The method and device, provided by the present application, for scheduling the distributed file system comprise: firstly, creating a new session based on a received session request of a user terminal; then, sending the first locking request for locking the lease directory to the manager of the distributed file system; then, sending a request for creating a new subdirectory named using an IP address and a port of the new session in the lease directory in response to receiving a response of successful first locking to the first locking request; and finally, designating the new session as a primary session in response to receiving a response of successful new subdirectory creation to the request for creating the new subdirectory. Therefore, the primary selection of the new session is implemented, and the new session is locked, thereby effectively improving the robustness of scheduling the distributed file system. In addition, the method and device for scheduling the distributed file system simplify a system architecture, do not need dependence on any third-party mechanism/system, promote the stability and evolvability of the method and device for scheduling the distributed file system, and can realize a stateless condition easily, thereby easily implementing a global fast load balancing mechanism and a fragmentation splitting and merging mechanism, etc.

BRIEF DESCRIPTION OF THE DRAWINGS

Other features, objectives and advantages of the present application will become more apparent by reading the detailed description of the nonrestrictive embodiments made with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
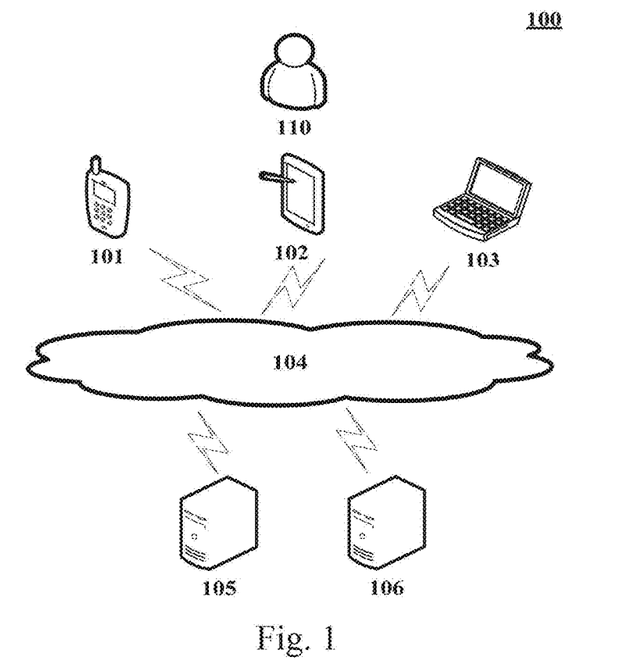
FIG. 1 is an exemplary system architecture diagram to which the present application may be applied.

FIG. 1 shows an exemplary architecture of a system 100 which may be used by a method and apparatus for generating search report according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the servers 105, 106 through the network 104, in order to transmit or receive messages, etc. Various communication client applications, such as video play applications, search engine applications, shopping applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be servers providing various services, for example, servers in the backend providing supports for the terminal devices 101, 102 or 103. The backend server may perform a processing such as storing or calculating on data submitted by the terminals, and return the result of the storing or calculating to the terminal devices upon receiving a request of the terminals.

It should be noted that the method for scheduling a distributed file system according to the embodiments of the present application is generally executed by the servers 105 and 106, and accordingly, an apparatus for scheduling a distributed file system is generally installed on the servers 105 and 106.

It should be appreciated that the numbers of the terminal devices, the networks and the servers in FIG. 1 are merely illustrative. Any number of terminal devices, networks and servers may be provided based on the actual requirements.

Figure 2:
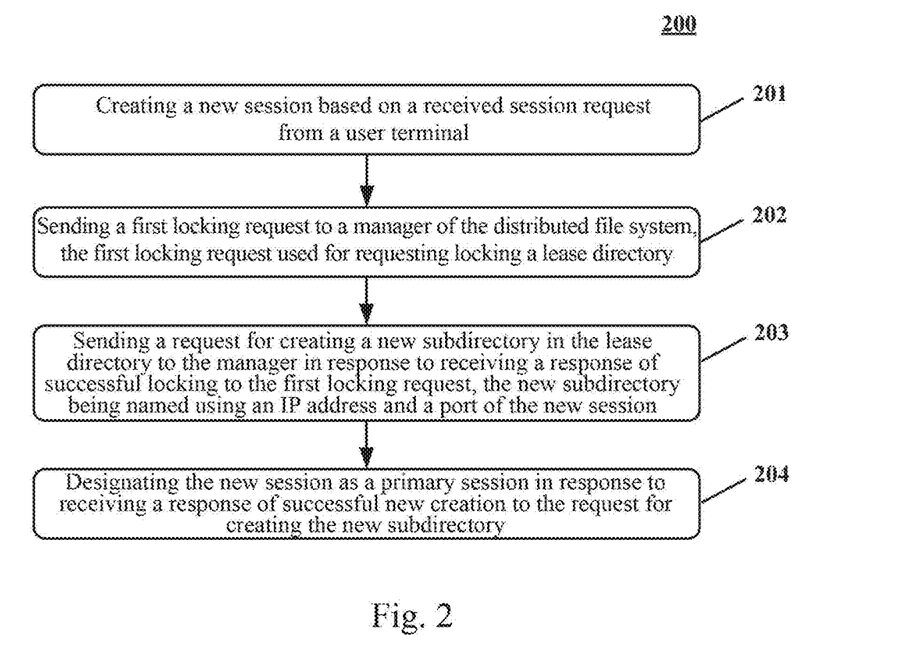
FIG. 2 is a schematic flow diagram of one embodiment of the method for scheduling the distributed file system according to the present application.

Continue to refer to FIG. 2, a process 200 of one embodiment of the method for scheduling the distributed file system according to the present application is shown. The method for scheduling the distributed file system comprises the following steps:

Step 201, creating a new session based on a received session request of a user terminal.

In the present embodiment, a device (e.g., servers 105 and 106 shown in FIG. 1) operating the method for scheduling the distributed file system provides an interface for creating the new session for the user terminal, and a new session is created between the interface and the user terminal when the interface receives a session request sent by the user terminal.

Step 202, sending a first locking request to a manager of the distributed file system, the first locking request used for requesting locking a lease directory.

In the present embodiment, in response to the creation of the new session in step 201, the new session is used as a default subordinate role, and the lease directory is locked by using the new session to grab a primary role. The lease directory here is a directory in the file system that is preset as an indicator to grab the primary session, and the locking mode here may be a locking mode in an existing technology or in a technology developed in the future, and is not limited by the present application. The distributed file system here may be a distributed storage system, a distributed computing system, or other storage systems based on distributed files, and may even include another distributed file system. The manager of the distributed file system (e.g., a directory tree manager) may record that the lease directory is currently locked by which session, and if that session is hung up, a lock held by the session is automatically cleaned.

Step 203, sending a request for creating a new subdirectory in the lease directory to the manager in response to receiving a response of successful locking to the first locking request, the new subdirectory being named using an IP address and a port of the new session.

In the present embodiment, when the response returned by the manager in step 202 to the first locking request is a successful locking, the request, including an IP address and a port of the new session, for creating a new subdirectory in the lease directory may be sent to the manager, so that the manager may name the subdirectory by using the IP address and the port of the new session.

Step 204, designating the new session as a primary session in response to receiving a response of successful new creation to the request for creating the new subdirectory.

In the present embodiment, when the response returned by the manager to the request for creating a new subdirectory is a successful new creation, successful primary grabbing of the new session may be determined, so that the new session may be designated as a primary session.

According to the method and device, provided by the above embodiment of the present application, for scheduling the distributed file system, the primary selection of the new session is implemented, and the new session is locked, thereby effectively improving the robustness of scheduling the distributed file system. In addition, the method and device for scheduling the distributed file system simplify a system architecture, do not need dependence on any third-party mechanism/system, promote the stability and evolvability of the method and device for scheduling the distributed file system, and facilitate the implementation of a stateless condition, thereby easily implementing a global fast load balancing mechanism and a fragmentation splitting and merging mechanism, etc.

Figure 3:
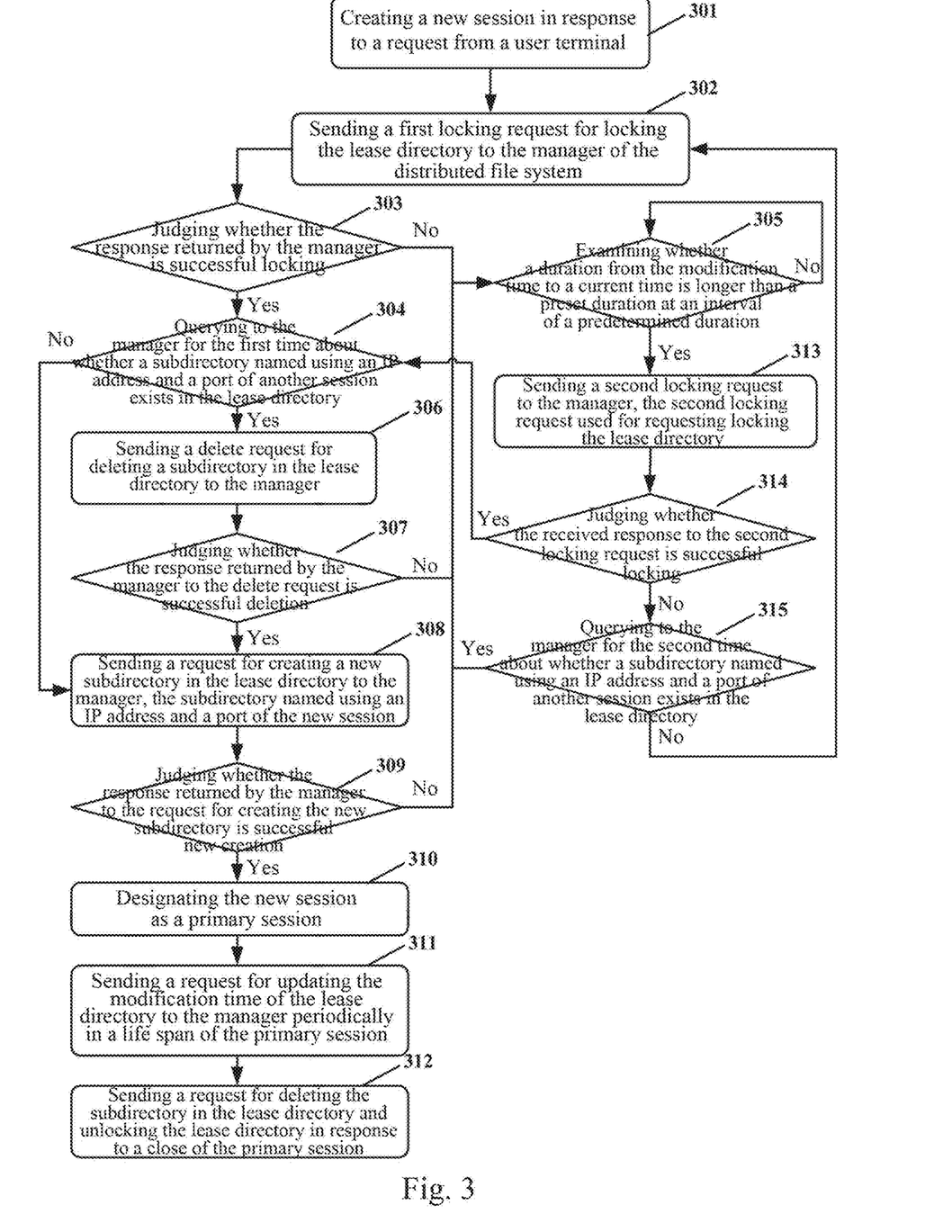
FIG. 3 is a schematic flow diagram of another embodiment of the method for scheduling the distributed file system according to the present application.

Further referring to FIG. 3, the process of another embodiment of the method for scheduling the distributed file system according to the present application is shown. The method for scheduling the distributed file system comprises the following steps:

Step 301, creating a new session in response to a request from a user terminal, and executing step 302 afterwards;

Step 302, sending a first locking request for locking the lease directory to the manager of the distributed file system, and executing step 303 afterwards;

Step 303, judging whether the response returned by the manager is a successful locking, if yes, executing step 304, and if no, executing step 305;

Step 304, querying to the manager for the first time about whether a subdirectory named using an IP address and a port of another session exists in the lease directory, if yes, executing step 306, and if no, executing step 308;

Step 305, examining whether a duration from the modification timestamp to a current time is longer than a preset duration at an interval of a predetermined duration, if yes, executing step 313, and if no, continuously executing step 305;

Step 306, sending a delete request for deleting a subdirectory in the lease directory to the manager, and executing step 307 afterwards;

Step 307, judging whether the response returned by the manager to the delete request is a successful deletion, if yes, executing step 308, and if no, executing step 305;

Step 308, sending a request for creating a new subdirectory in the lease directory to the manager, the subdirectory named using an IP address and a port of the new session, and executing step 309 afterwards;

Step 309, judging whether the response returned by the manager to the request for creating the new subdirectory is successful new creation, if yes, executing step 310, and if no, executing step 305;

Step 310, designating the new session as a primary session, and executing step 311 afterwards;

Step 311, sending a request for updating the modification timestamp of the lease directory to the manager periodically in the life span of the primary session, and executing step 312 afterwards;

Step 312, sending a request for deleting the subdirectory in the lease directory and unlocking the lease directory in response to a close of the primary session;

Step 313, sending a second locking request to the manager, the second locking request used for requesting locking the lease directory, and executing step 314 afterwards;

Step 314, judging whether the received response to the second locking request is a successful locking, if yes, executing step 304, and if no, executing step 315; and Step 315, querying to the manager for the second time about whether a subdirectory named using an IP address and a port of another session exists in the lease directory, if yes, executing step 305, and if no, executing step 302.

In the present embodiment, a directory (hereinafter referred to as the lease directory) may be specified in advance in the distributed file system as an indicator for primary grabbing, a grabbed primary session uses its own IP address and port (e.g., IP:PORT) as a name of a subdirectory recorded in a subtree of the lease directory, and we call the name a service identifier. The primary session will regularly update the last modification time of the lease directory, a subordinate session regularly examines whether the time exceeds a prescribed duration without any change, and if yes, primary grabbing is initiated.

The structure of the subdirectory in the lease directory is illustrated by the following examples:

Assuming that two sessions, namely A (assuming that IP:PORT is 1.1.1.1:1111) and B (assuming that IP:PORT is 2.2.2.2:2222) participate in a primary selection, and if A is the primary session, the directory structure is:

xxx/lease/1.1.1.1:1111

If B is the primary session, the directory structure is:

xxx/lease/2.2.2.2:2222

The lease here refers to the lease directory, and the name of the subdirectory of the lease directory represents a service identifier of the current primary.

In the present embodiment, the primary selection may be implemented through the following processes:

Process 1: when a new session is started, the new session is defaulted in a subordinate role. The session locks the lease directory first, and if the locking is failed, it means that there is a primary session, and the session enters a periodic examination phase for the lease directory time. If the locking is successful, it indicates that a primary is grabbed, then contents of the lease directory are emptied first, and own service identifier is then recorded in the lease directory to end the process.

Process 2: the session continuously examines whether the lease directory time exceeds a specified time threshold and the time still has no change, the primary selection is triggered by locking the lease directory if the time exceeds the specified time threshold. If the locking is successful, the process of primary grabbing is ended as referred in Process 1. If the locking is failed, whether a service identifier of another role exists in the lease directory is examined first. If the service identifier exists, it means that another session grabbed the primary, and this session enters the periodic examination phase of examining the lease directory time; and if the service identifier does not exist, the locking execution continues after a while, and the previous processes are repeated.

The method and device, provided by the above embodiment of the present application, for scheduling the distributed file system, may implement a role transformation process of the new session from a primary role to a subordinate role by executing the operation steps described in FIG. 3 in response to the created new session, and the locking of the primary session is realized, thereby effectively improving the robustness of scheduling the distributed file system. In addition, the method and device for scheduling the distributed file system simplify a system architecture, do not need dependence on any third-party mechanism/system, promote the stability and evolvability of the method and device for scheduling the distributed file system, and may realize a stateless condition easily, thereby easily implementing a global fast load balancing mechanism and a fragmentation splitting and merging mechanism, etc.

In some optional implementations of the present embodiment (not shown in the Figs.), the method for scheduling the distributed file system may further comprise: receiving a request for generating logs; generating a log sequence number of each log for each data stream; creating a new log file in response to switching the primary session or a size of the log file reaching a predetermined byte; naming the created log file after a smallest log sequence number in the log file; adding each of the log sequence number, lengths of the logs, check information and an IP address of a session added with logs to header information of the created log file; and writing the logs into the created log file until the size of the log file reaches the predetermined byte.

In the above implementations, by generating a log sequence number of each log for each data stream in response to receiving a request for generating logs, then creating a new log file in response to switching the primary session or a size of the log file reaching a predetermined byte; then naming the created log file after a smallest log sequence number in the log file, and finally, adding each of the log sequence number, lengths of the logs, check information and an IP address of a session added with logs to header information of the created log file and writing the logs into the created log file until the size of the log file reaches the predetermined byte, the replication and persistence of data streams are realized.

In some optional implementations of the present embodiment (not shown in the Figs.), the method may further comprise: receiving a request for generating a snapshot; triggering the snapshot at an interval of a predetermined time; and deleting a log file having all log sequence numbers being smaller than log sequence numbers in the snapshot.

In the present implementation, a periodic snapshot interface is provided, and is triggered according to a predetermined time interval by default, and a custom triggering strategy may also be designed. Every time after executing one snapshot, the present scheme automatically deletes files of records of which the log sequence numbers are smaller than a corresponding log sequence number of this snapshot. It should be noted that the first half parts of some files are smaller than the log sequence number, and the second half parts are greater than the log sequence number, so these files cannot be deleted this time. It is a compaction process to make a snapshot and then delete data. The compaction of data streams may be realized by triggering a snapshot at an interval of a predetermined time in response to receiving a request for generating the snapshot, and deleting a log file having all log sequence numbers being smaller than log sequence numbers in the snapshot.

In some optional implementations of the above embodiments (not shown in the Figs.), the method may further comprise: receiving a request for replaying logs; and replaying the logs according to the log sequence numbers.

In the present implementation, logs may be replayed to a state machine, namely the written data are submitted to a service unit one by one for processing in a memory strictly according to a same sequence as when the data are written. For the primary session, after it is written into the distributed file system, the record is directly replayed in a memory state machine. It can be seen that the replay sequence of the state machine strictly conforms to a monotonic increasing order of the log sequence numbers, and the two are incomplete agreement. For the subordinate session, this scheme provides an automatic cycle execution mechanism which automatically read records from data streams (i.e., a series of files of the distributed file system) in sequence, and after reading the records, the mechanism submits the records to the state machine for replay strictly in accordance with the sequence of the log sequence numbers, therefore, it can be seen that a primary-subordinate replay sequence ensures strict consistency because of the sequence of the log sequence numbers.

Figure 4:
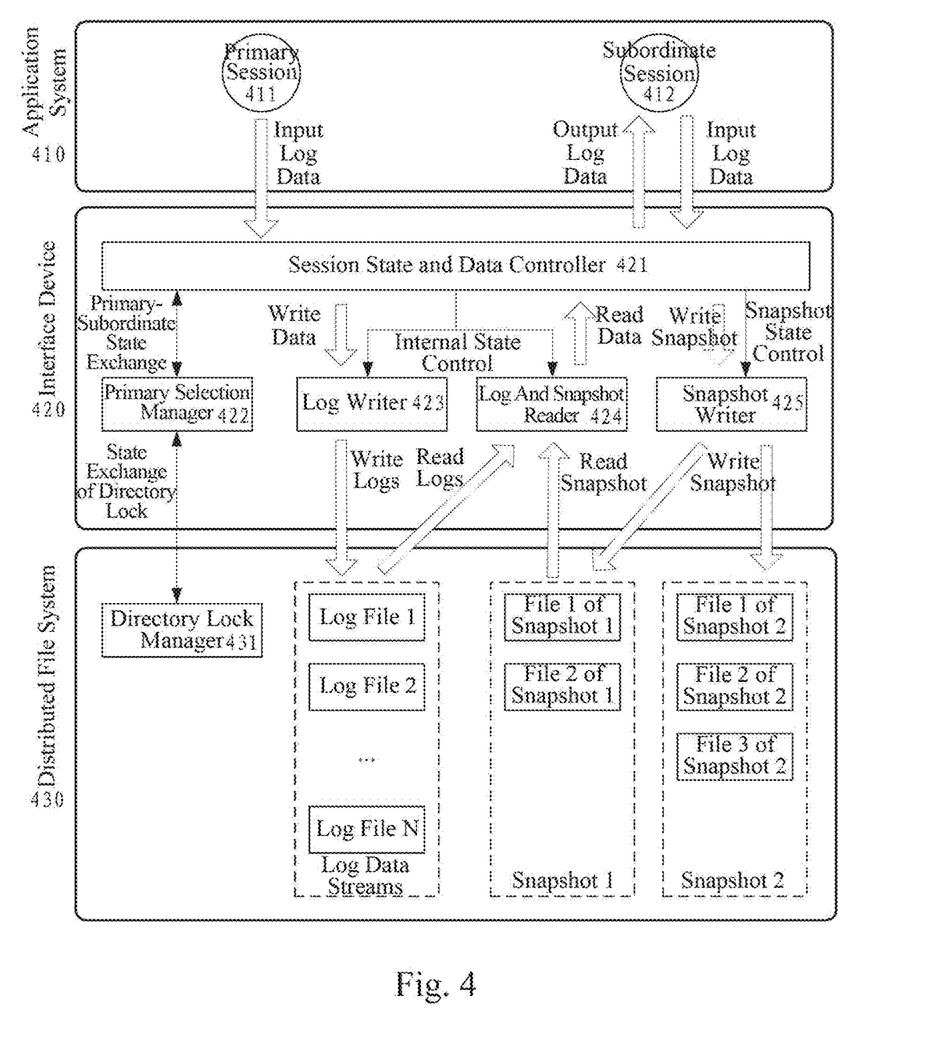
FIG. 4 is an application scenario of one embodiment of the method for scheduling the distributed file system according to the present application.

Further refer to FIG. 4, an application scenario of one embodiment of the method for scheduling the distributed file system according to the present application is shown.

As shown in FIG. 4, the application scenario of the method for scheduling the distributed file system comprises: an application system 410, an interface device 420 and a distributed file system 430.

Firstly, the application system 410 creates a session 411 and a session 412 with the interface device 420, the session 411 and the session 412 interact with a primary selection manager 422 via a session state and data controller 421 in the interface device 420, and the state exchange of a directory lock is performed by the primary selection manager 422 and a directory lock manager 431 in the distributed file system 430, so as to designate the session 411 as a primary session.

When the primary session 411 and the subordinate session 412 interact with the session state and data controller 421, the primary session 411 and the subordinate session 412 may write logs into a log writer 423 via the session state and data controller 421, and then write log data streams into the distributed file system 430 via the log writer 423, for example, a log file 1, a log file 2, until a log file N, etc.; the primary session 411 and the subordinate session 412 may also write a snapshot into a snapshot writer 425 via the session state and data controller 421, and then write the snapshot into the distributed file system via the snapshot writer 425, for example, writing a snapshot file 1, a snapshot file 2, etc., wherein the snapshot 1 may include a file 1 and a file 2 of the snapshot 1, the snapshot 2 may include a file 1, a file 2 and a file 3 of the snapshot 2, etc.; and the subordinate session 412 may also read logs and/or read snapshots from a log and snapshot reader 424 via the session state and data controller 421, and at this moment, the snapshot reader reads data requested by the session 412 from one or more of the following data stored in the distributed file system 421: log files 1 to N, a snapshot 1 and a snapshot 2.

It should be appreciated that in the present application scenario, the method for scheduling the distributed file system, provided by the present application, is implemented by the interface device 420, and when the primary session 411 and the subordinate session 412 interact with the session state and data controller 421, the session state and data controller 421 may perform internal state control on the log writer 423 and the log and snapshot reader 424, and may perform snapshot state control on the snapshot writer 425. In addition, the present application scenario is only an exemplary application scenario of the method for scheduling the distributed file system of the present application and does not represent limitation to the present application. For example, the five devices, namely the session state and data controller 421, the primary selection manager 422, the log writer 423, the log and snapshot reader 424 and the snapshot writer 425, may be combined into one or more devices; and any one of the five devices may also be split into multiple sub-devices, which is not limited by the present application.

Figure 5:
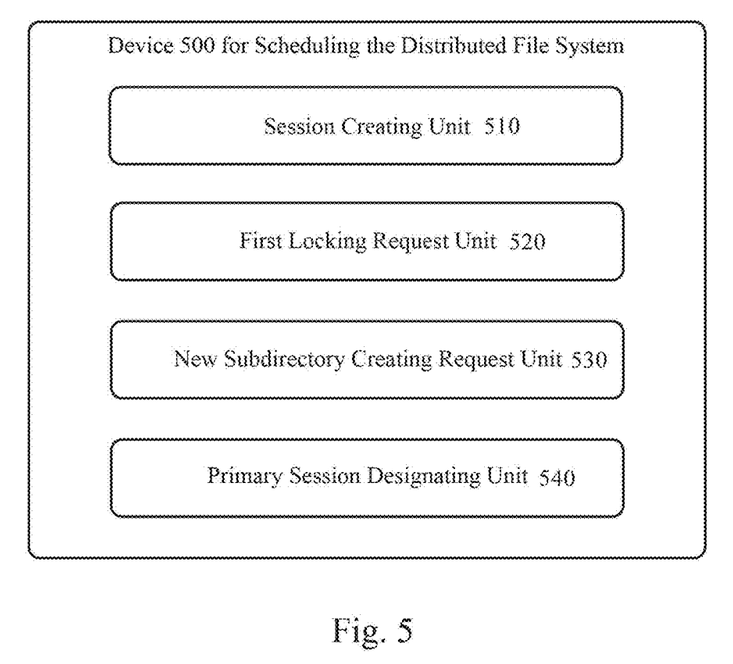
FIG. 5 is an exemplary structure diagram of one embodiment of the device for scheduling the distributed file system according to the present application.

Further refer to FIG. 5, as an implementation of the above method, the present application provides one embodiment of the device for scheduling the distributed file system, and this device embodiment corresponds to the method embodiment illustrated in FIG. 2, therefore, the operations and characteristics described above for the method are equally applicable to a device 500 and units contained therein, which are no longer repeated here. The device specifically may be applied to various electronic devices.

As shown in FIG. 5, the device 500, provided by the present embodiment, for scheduling the distributed file system comprises: a session creating unit 510, a first locking request unit 520, a new subdirectory creating request unit 530 and a primary session designating unit 540.

Wherein, the session creating unit 510 is used for creating a new session based on a received session request from a user terminal.

The first session request unit 520 is used for sending a first locking request to a manager of the distributed file system, the first locking request used for requesting locking a lease directory.

The new subdirectory creating request unit 530 is used for sending a request for creating a new subdirectory in the lease directory to the manager in response to receiving a response of successful locking to the first locking request, the new subdirectory being named using an IP address and a port of the new session.

The primary session designating unit 540 is used for designating the new session as a primary session in response to receiving a response of successful new creation to the request for creating the new subdirectory.

In some optional implementations of the present embodiment, the device may further comprises one or more of: a modification time unit, which is used for sending a request for updating a modification time of the lease directory to the manager periodically in a life span of the primary session; and a deleting and locking unit, which is used for sending a request for deleting the subdirectory in the lease directory and unlocking the lease directory in response to a close of the primary session.

In some optional implementations of the present embodiment, the new subdirectory query unit may comprise: a first query request subunit, which is used for sending a first query request to the manager in response to receiving a response of successful locking to the first locking request, wherein the first query request is used for querying whether a subdirectory named using an IP address and a port of another session exists in the lease directory; a subdirectory deleting subunit, which is used for sending a delete request to the manager in response to receiving the response of existence to the first query request, wherein the delete request is used for deleting the subdirectory in the lease directory; and a new subdirectory creating subunit, which is used for sending the request for creating the new subdirectory in the lease directory to the manager in response to receiving a response of nonexistence to the first query request or receiving a response of successful deletion to the delete request.

In some optional implementations of the present embodiment, the device further comprises: a duration examining unit, which is used for examining whether a duration from the modification time to a current time is longer than a preset duration at an interval of a predetermined duration in response to receiving a response of failed locking to the first locking request; a second locking request unit, which is used for sending a second locking request to the manager in response to the duration from the modification time to the current time being longer than the preset duration, wherein the second locking request is used for requesting locking the lease directory; and the subdirectory query subunit, which is used for sending the first query request to the manager in response to receiving a response of successful locking to the second locking request.

In some optional implementations of the present embodiment, the device further comprises: a second query request unit, which is used for sending a second query request to the manager in response to receiving a response of failed locking to the second locking request, wherein the second query request is used for querying whether a subdirectory named using an IP address and a port of another session exists in the lease directory; and the duration examining unit, which is further used for examining whether a duration from the modification time to a current time is longer than a preset duration at an interval of a predetermined duration in response to receiving a response of existence to the second query request.

In some optional implementations of the present embodiment, the device further comprises: the first locking request unit, which is further used for sending the first locking request for locking the lease directory to the manager of the distributed file system in response to receiving a response of nonexistence to the second query request.

In some optional implementations of the present embodiment, the device further comprises one or more of: the duration examining unit, which is further used for examining whether a duration from the modification time to a current time is longer than a preset duration at an interval of a predetermined duration in response to receiving a response of failed new creation to the request for creating a new subdirectory; the duration examining unit, which is further used for examining whether a duration from the modification time to a current time is longer than a preset duration at an interval of a predetermined duration in response to receiving a response of failed deletion to the delete request; and the duration examining unit, which is further used for examining whether a duration from the modification time to a current time is longer than a preset duration at an interval of a predetermined duration in response to the duration from the modification time to the current time being not longer than the preset duration.

In some optional implementations of the present embodiment, the device further comprises: a sequence number generating unit, which is used for generating a log sequence number of each log for each data stream in response to receiving a request for generating logs; a file creating unit, which is used for creating a new log file in response to switching the primary session or a size of the log file reaching a predetermined byte; a file naming unit, which is used for naming the created log file after a smallest log sequence number in the log file; an information adding unit, which is used for adding each of the log sequence number, lengths of the logs, check information and an IP address of a written session to header information of the created log file; and a log adding unit, which is used for adding each of the log into the created log file until the size of the log file reaches the predetermined byte.

In some optional implementations of the present embodiment, the device further comprises: a snapshot triggering unit, which is used for triggering a snapshot at an interval of a predetermined time in response to receiving a request for generating the snapshot; and a file deleting unit, which is used for deleting a log file having all log sequence numbers being smaller than log sequence numbers in the snapshot.

In some optional implementations of the present embodiment, the device further comprises: a replay request receiving unit, which is used for receiving a request for replaying logs; and a log replaying unit, which is used for replaying the logs according to the log sequence numbers.

It should be appreciated that the device for scheduling the distributed file system in the above embodiment of the present application is only an exemplary description of the present application and does not represent the limitation to the application. For example, multiple units included can be combined into one unit as required, and the units included may be split into multiple subunits as required. The server side may be a single server, multiple servers, or server clusters.

Figure 6:
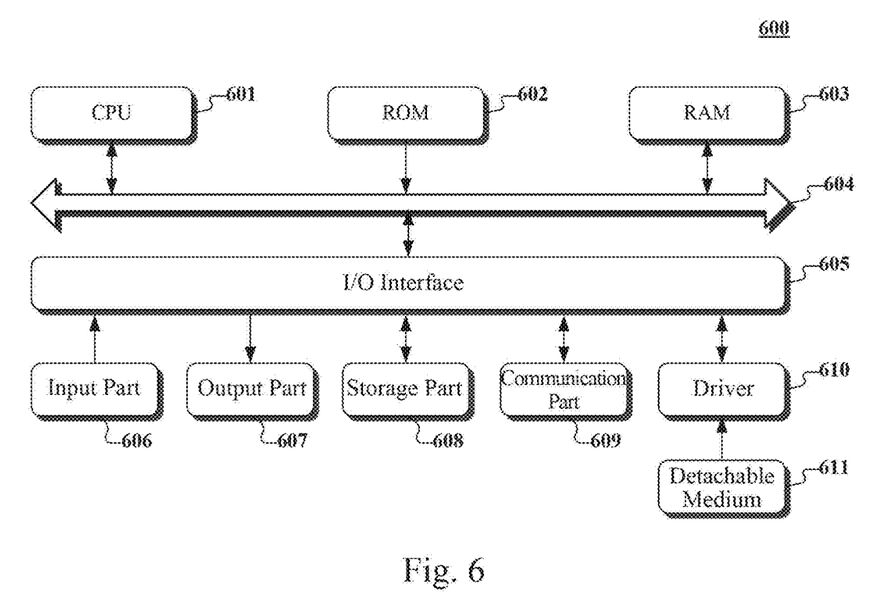
FIG. 6 is a structure diagram of a computer system of a terminal device or server suitable for implementing the embodiments of the present application.

Referring to FIG. 6, a schematic structural diagram of a computer system 600 adapted to implement the terminal devices or servers of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a session creating unit, a first locking request unit, a new subdirectory creating request unit and a primary session designating unit where the names of these units or modules are not considered as a limitation to the units or modules. For example, the session creating unit may also be described as "a unit for creating a new session based on a received session request from a user terminal."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: creating a new session based on a received session request from a user terminal; sending a first locking request to a manager of the distributed file system, the first locking request used for requesting locking a lease directory; sending a request for creating a new subdirectory in the lease directory to the manager in response to receiving a response of successful locking to the first locking request, the new subdirectory being named using an IP address and a port of the new session; and designating the new session as a primary session in response to receiving a response of successful new creation to the request for creating the new subdirectory.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for scheduling a distributed file system, the method comprising:
   creating a new session based on a received session request from a user terminal;
   sending a first locking request to a manager of the distributed file system, the first locking request used for requesting locking a lease directory;
   sending a request for creating a new subdirectory in the lease directory to the manager in response to receiving a response of successful locking to the first locking request, the new subdirectory being named using an IP address and a port of the new session; and
   designating the new session as a primary session in response to receiving a response of successful new creation to the request for creating the new subdirectory.

2. The method according to claim 1, further comprising one or more of:
   sending a request for updating a modification time of the lease directory to the manager periodically in a life span of the primary session; and
   sending a request for deleting the subdirectory in the lease directory and unlocking the lease directory in response to a close of the primary session.

3. The method according to claim 1, wherein the sending a request for creating a new subdirectory in the lease directory to the manager in response to receiving a response of successful locking to the first locking request comprises:
   sending the first query request to the manager in response to receiving the response of successful locking to the first locking request, wherein the first query request is used for querying whether a subdirectory named after an IP address and a port of another session exists in the lease directory;
   sending a delete request to the manager in response to receiving a response of existence to the first query request, wherein the delete request is used for deleting the subdirectory in the lease directory; and
   sending the request for creating the new subdirectory in the lease directory to the manager in response to receiving a response of nonexistence to the first query request or receiving a response of successful deletion to the delete request.

4. The method according to claim 3, further comprising:
   examining whether a duration from the modification time to a current time is longer than a preset duration at an interval of a predetermined duration in response to receiving a response of failed locking to the first locking request;
   sending a second locking request to the manager in response to the duration from the modification time to the current time being longer than the preset duration, wherein the second locking request is used for requesting locking the lease directory; and
   sending the first query request to the manager in response to receiving a response of successful locking to the second locking request.

5. The method according to claim 4, further comprising:
   sending a second query request to the manager in response to receiving a response of failed locking to the second locking request, wherein the second query request is used for querying whether a subdirectory named after an IP address and a port of another session exists in the lease directory; and
   examining whether a duration from the modification time to a current time is longer than a preset duration at an interval of a predetermined duration in response to receiving a response of existence to the second query request.

6. The method according to claim 5, further comprising:
   sending the first locking request for locking the lease directory to the manager of the distributed file system in response to receiving a response of nonexistence to the second query request.

7. The method according to claim 4, further comprising one or more of:
   examining whether a duration from the modification time to a current time is longer than a preset duration at an interval of a predetermined duration in response to receiving a response of failed new creation to the request for creating a new subdirectory;
   examining whether a duration from the modification time to a current time is longer than a preset duration at an interval of a predetermined duration in response to receiving a response of failed deletion to the delete request; and
   examining whether a duration from the modification time to a current time is longer than a preset duration at an interval of a predetermined duration in response to the duration from the modification time to the current time being not longer than the preset duration.

8. The method according to claim 1, further comprising:
   receiving a request for generating logs;
   generating a log sequence number for each log of each data stream;
   creating a new log file in response to switching the primary session or a size of the log file reaching a predetermined byte;
   naming the created log file after a smallest log sequence number in the log file;

adding each of the log sequence number, lengths of the logs, check information and an IP address of a written session to header information of the created log file; and adding each of the log into the created log file until the size of the log file reaches the predetermined byte.

9. The method according to claim 8, further comprising:
receiving a request for generating a snapshot;
triggering the snapshot at an interval of a predetermined time; and
deleting a log file having all log sequence numbers being smaller than log sequence numbers in the snapshot.

10. The method according to claim 8, further comprising:
receiving a request for replaying logs; and
replaying the logs according to the log sequence numbers.

11. A device for scheduling a distributed file system, the device comprising:
at least one processor; and
a memory storing instructions, which when executed by the at least one processor, cause the at least one processor to perform operations, the operations comprising:
creating a new session based on a received session request from a user terminal;
sending a first locking request to a manager of the distributed file system, the first locking request used for requesting locking a lease directory;
sending a request for creating a new subdirectory in the lease directory to the manager in response to receiving a response of successful locking to the first locking request, the new subdirectory being named using an IP address and a port of the new session; and
designating the new session as a primary session in response to receiving a response of successful new creation to the request for creating the new subdirectory.

12. The device according to claim 11, the operations further comprising one or more of:
sending a request for updating a modification time of the lease directory to the manager periodically in a life span of the primary session; and
sending a request for deleting the subdirectory in the lease directory and unlocking the lease directory in response to a close of the primary session.

13. The device according to claim 11, wherein the sending a request for creating a new subdirectory in the lease directory to the manager in response to receiving a response of successful locking to the first locking request comprises:
sending the first query request to the manager in response to receiving a response of successful locking to the first locking request, wherein the first query request is used for querying whether a subdirectory named using an IP address and a port of another session exists in the lease directory;
sending a delete request to the manager in response to receiving a response of existence to the first query request, wherein the delete request is used for deleting the subdirectory in the lease directory; and
sending the request for creating the new subdirectory in the lease directory to the manager in response to receiving a response of nonexistence to the first query request or receiving a response of successful deletion to the delete request.

14. The device according to claim 13, the operations further comprising:
examining whether a duration from the modification time to a current time is longer than a preset duration at an interval of a predetermined duration in response to receiving a response of failed locking to the first locking request;
sending a second locking request to the manager in response to the duration from the modification time to the current time being longer than the preset duration, wherein the second locking request is used for requesting locking the lease directory; and
sending the first query request to the manager in response to receiving a response of successful locking to the second locking request.

15. The device according to claim 14, the operations further comprising:
sending a second query request to the manager in response to receiving a response of failed locking to the second locking request, wherein the second query request is used for querying whether a subdirectory named using an IP address and a port of another session exists in the lease directory; and
examining whether a duration from the modification time to a current time is longer than a preset duration at an interval of a predetermined duration in response to receiving a response of existence to the second query request.

16. The device according to claim 15, the operations further comprising:
sending the first locking request for locking the lease directory to the manager of the distributed file system in response to receiving a response of nonexistence to the second query request.

17. The device according to claim 14, the operations further comprising one or more of:
examining whether a duration from the modification time to a current time is longer than a preset duration at an interval of a predetermined duration in response to receiving a response of failed new creation to the request for creating a new subdirectory;
examining whether a duration from the modification time to a current time is longer than a preset duration at an interval of a predetermined duration in response to receiving a response of failed deletion to the delete request; and
examining whether a duration from the modification time to a current time is longer than a preset duration at an interval of a predetermined duration in response to the duration from the modification time to the current time being not longer than the preset duration.

18. The device according to claim 11, the operations further comprising:
receiving a request for generating logs;
generating a log sequence number of each log for each data stream;
creating a new log file in response to switching the primary session or the size of the log file reaching a predetermined byte;
naming the created log file after a smallest log sequence number in the log file;
adding each of the log sequence number, lengths of the logs, check information and an IP address of a written session to header information of the created log file; and
adding each of the log into the created log file until the size of the log file reaches the predetermined byte.

19. The device according to claim 18, the operations further comprising:
receiving a request for generating a snapshot;

triggering the snapshot at an interval of a predetermined time; and deleting a log file having all log sequence numbers being smaller than log sequence numbers in the snapshot.

20. A non-transitory computer storage medium storing a computer program, which when executed by one or more processors, cause the one or more processors to perform operations, the operations comprising:

creating a new session based on a received session request from a user terminal;

sending a first locking request to a manager of the distributed file system, the first locking request used for requesting locking a lease directory;

sending a request for creating a new subdirectory in the lease directory to the manager in response to receiving a response of successful locking to the first locking request, the new subdirectory being named using an IP address and a port of the new session; and designating the new session as a primary session in response to receiving a response of successful new creation to the request for creating the new subdirectory.

* * * * *